United States Patent Office 3,539,554
Patented Nov. 10, 1970

3,539,554
11 - SUBSTITUTED 5,11 - DIHYDRO - 6H - PYRIDO [2,3-b][1,4]BENZODIAZEPIN-6-ONES
Gunther Schmidt, Gunther Engelhardt, Hans Machleidt, and Karl Konigsdorfer, Biberach an der Riss, Germany, assignors to Boehringer Ingelheim G.m.b.H., Ingelheim am Rhine, Germany, a corporation of Germany
No Drawing. Filed Oct. 30, 1967, Ser. No. 679,172
Claims priority, application Germany, Oct. 31, 1966, T 32,424; Sept. 15, 1967, T 34,793
Int. Cl. C07d 53/02
U.S. Cl. 260—239.3     4 Claims

ABSTRACT OF THE DISCLOSURE

The compounds are 11-alkyl substituted 5,11-dihydro-6H-pyrido[2,3-b][1,4]benzodiazepin - 6 - ones and 5 - hydrocarbyl substituted derivatives thereof, useful as antiphlogistics, analgesics, antipyretics, sedatives and anticonvulsives in warm-blooded animals.

THE PRIOR ART

German Pats. 1,179,943 and 1,204,680 describe 5,11-dihydro - 6H - pyrido[2,3-b][1,4]benzodiazepin - 6 - ones which are unsubstituted in the 11-position.

This invention relates to novel 11-alkyl substituted 5,11-dihydro-6H-pyrido[2,3-b][1,4]benzodiazepin-6-ones and 5-substituted derivatives thereof, as well as to various methods of preparing these compounds.

More particularly, the present invention relates to compounds of the formula

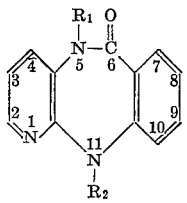

wherein
$R_1$ is hydrogen, lower alkyl or lower alkenyl,
$R_2$ is lower alkyl.

The compounds according to the present invention may be prepared by a number of different methods involving well known chemical principles, amount which the following have proved to be particularly convenient and efficient.

Method A.—By subjecting a compound of the formula

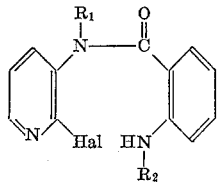

wherein Hal is halogen, and $R_1$ and $R_2$ have the same meanings as in Formula I, to a cyclization reaction. $R_1$ is preferbaly methyl, ethyl or allyl, and $R_2$ is preferably methyl or ethyl. The cyclization is effected by heating Compound II to elevated temperatures, preferably above 150° C., advantageously in the presence of a high-boiling-point inert solvent, such as trichlorobenzene or paraffin oil, and in the presence of a basic catalyst, such as potash, or of copper powder, preferably in an atmosphere of an inert gas, such as nitrogen. Upon heating Compound II, the evolution of hydrogen halide begins at temperatures above 150° C. which ceases after heating for several hours more. Thereafter, the high-boiling-point solvent which may be present is distilled off in vacuo, and the desired end product of the Formula I crystallizes out of the distillation residue upon cooling. The raw product is then purified by conventional methods, such as recrystallization from an inert solvent.

Method B.—By reacting an isatoic acid anhydride of the formula

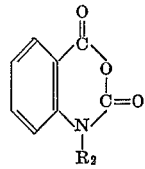

wherein $R_2$ has the same meanings as in Formula I, with a 2-halo-3-amino-pyridine of the formula

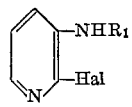

wherein $R_1$ has the same meanings as in Formula I and Hal is halogen, at a temperature above 150° C. This method makes it possible to prepare a compound of the Formula I with good yields by means of a continuous reaction procedure. The reaction is carried out either without a solvent medium or in the presence of a high-boiling-point inert solvent, such as trichlorobenzene, tetraethyleneglycol dimethylether, tetrahydronaphthalene or the like. Upon heating the reaction mixture, carbon dioxide is initially evolved at temperatures between 120 and 150° C., and a compound of the Formula II above is formed as an intermediate. However, this intermediate need not be isolated; instead, the intermediate is cyclized in situ, accompanied by hydrogenhalide evolution, by heating the reaction mixture containing it to a temperature above 150° C., preferably to between 180 and 250° C. Of course, the reaction mixture of Compounds III and IV may also be heated right away to the temperature required for cyclization.

In those instances where method A or B yields a compound of the Formula I wherein $R_1$ is hydrogen, this compound may, if desired, be subsequently converted by conventional methods through an analogous 5-alkali metal compound as an intermediate into a compound of the Formula I wherein $R_1$ is lower alkyl or lower alkenyl. The intermediate 5-alkali metal compound may, for example, be formed by reacting a compound of the Formula I wherein $R_1$ is hydrogen with an alkali metal hydroxide, alkali metal alcoholate, alkali metal amide or alkali metal hydride; the solution or suspension of the 5-alkali metal compound thus obtained is then reacted as such with a compound of the Formula $R_3X$ wherein $R_3$ is lower alkyl or lower alkenyl and X is the anion of a reactive ester, such as halogen or —$SO_3H$.

A compound of the Formula II, which is required as a starting material for method A, may be obtained by reacting an analogous 2-halo-3-amino-pyridine of the Formula IV with a suitably substituted N-p-toluenesulfonyl-anthranilic acid halide and subsequent removal of the p-toluenesulfonyl radical by conventional methods. The preparation of two specific compounds not previously described in the literature, which are needed for the synthesis of compounds according to the present invention, is described in Examples A and B below.

The starting compounds of the Formulas III and IV required for method B are all known and are described in the literature.

The following examples further illustrate the present invention and will enable others skilled in the art to understand it more completely. It should be understood,

EXAMPLE A

Preparation of 2-chloro-3-[(2'-methylamino-benzoyl)-amino]-pyridine (II: $R_1$=H, $R_2$=$CH_3$)

75 gm. (0.58 mol) of 2-chloro-3-amino-pyridine and 71 gm. (0.58 mol) of N,N-dimethyl-amine were dissolved in 1200 cc. of carbon tetrachloride, and the solution was briefly heated to the boiling point. Thereafter, while stirring, 183 gm. (0.57 mol) of N-methyl-N-(p-toluenesulfonyl)-anthranilic acid chloride (M.P. 85–88° C.; prepared by chlorination of the corresponding anthranilic acid with phosphoruspentachloride) were added to the hot solution in small portions. The mixture was then refluxed for three hours and allowed to cool. Subsequently, 400 cc. of aqueous 20% hydrochloric acid were added dropwise, the mixture was stirred for 30 minutes at room temperature, then vacuum filtered, and the filter cake was washed first with a small amount of ethanol and then with water, yielding 90% of theory of raw 2-chloro-3-[(N-methyl - N - p-toluenesulfonyl-2'-amino-benzoyl)-amino]-pyridine, M.P. 153–156° C. This raw product was introduced in small portions into aqueout 90% sulfuric acid at room temperature, and the mixture was stirred for two hours at 90° C. After cooling, the resulting acid aqueous solution was stirred into ten times its amount of ice. Thereafter, while thoroughly cooling, the cold aqueous solution was made weakly alkaline with aqueous 30% sodium hydroxide, the precipitate formed thereby was collected by vacuum filtration, and the filter cake was washed with water and then recrystallized from ethanol. 80% of theory of 2-chloro-3-[(2'-methylamino - benzoyl) - amino]-pyridine, M.P. 147–148° C., were obtained.

EXAMPLE B

Preparation of 2-chloro-3-[(2'-ethylamino-benzoyl)-amino]-pyridine

Using a procedure analogous to that described in Example A, 2-chloro-3-[(2'-ethylamino - benzoyl)-amino]pyridine, M.P. 100–101° C., was prepared from 2-chloro-3-[(N-ethyl-N-p-toluenesulfonyl - 2' - amino-benzoyl)]amino-pyridine, M.P. 147–150° C.

EXAMPLE 1

Preparation of 11-methyl-5,11-dihydro-6H-pyrido[2,3-b][1,4]benzodiazepin-6-one by Method A 160 gm. 2 - chloro-3-[(2' - methylamino-benzoyl)-amino]-pyridine were admixed with 160 cc. of 1,2,4-trichlorobenzene, and the mixture was heated to the boiling point of the trichlorobenzene while stirring and passing nitrogen therethrough. Starting at about 190° C., the evolution of gaseous hydrogen chloride began. The reaction mixture was refluxed for 3½ hours while stirring and passing nitrogen therethrough, at the end of which the evolution of hydrogen chloride ceased. The reaction solution was then allowed to cool, and the substance which crystallized out during cooling was collected by vacuum filtration, washed with benzene and recrystallized from ethanol. 65% of theory of 11-methyl-5,11-dihydro-6H-pyrido[2,3 - b][1,4]benzodiazepin-6-one, M.P. 215–216° C., of the formula

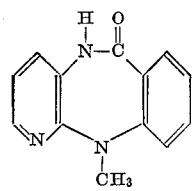

were obtained.

Analysis.—Calc'd for $C_{13}H_{11}N_3O$ (percent) (molecular weight 225.3): C, 69.32; H, 4.92; N, 18.65. Found (percent): C, 69.50; H, 5.05; N, 18.40.

The same compound was obtained by heating 2-chloro-3-[(2' - methylamino-benzoyl)-amino]-pyridine at 200–250° C. without a solvent until the evolution of hydrogen chloride ceased, stirring the product with dilute sodium hydroxide, and recrystallizing the insoluble matter from ethanol.

EXAMPLE 2

Preparation of 11-ethyl-5,11-dihydro-6H-pyrido[2,3-b][1,4]benzodiazepin-6-one by Method A 2-chloro - 3 - [(2'-ethylamino-benzoyl)-amino]-pyridine was heated and refluxed in 1,2,4-trichlorobenzene as described in Example 1. The evolution of hydrogen chloride gas began at 160° C., and after it had ceased the trichlorobenzene was distilled off in vacuo, and the residue was recrystallized from ethyl acetate. 57% of theory of 11 - ethyl - 5,11 - dihydro - 6H - pyrido[2,3-b][1,4]benzodiazepin-6-one, M.P. 190–193° C., of the formula

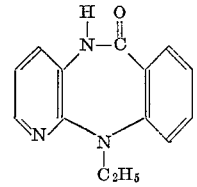

were obtained.

Analysis.—Calc'd for $C_{14}H_{13}N_3O$ (percent) (molecular weight 239.3): C, 70.28; H, 5.48; N, 17.56. Found (percent): C, 70.10; H, 5.57; N, 17.86.

EXAMPLE 3

Preparation of 5,11-dimethyl-5,11-dihydro-6H-pyrido[2,3-b][1,4]benzodiazepin-6-one 9 gm. (0.04 mol) of 11-methyl-5,11-dihydro-6H-pyrido[2,3-b][1,4]benzodiazepin-6-one and a solution of 22.4 gm. (0.4 mol) of potassium hydroxide in 55 cc. of water were dissolved in 65 cc. of ethanol, and the solution was refluxed for ten minutes. Thereafter, 57 gm. (0.4 mol) of methyl iodide were added dropwise to the reaction solution over a period of 30 minutes, the resulting mixture was refluxed for three hours, the reaction solution was concentrated to about one-fifth of its volume, the concentrated solution was allowed to cool and was then made alkaline with dilute sodium hydroxide. The alkaline solution was extracted with chloroform, the extract solution was evaporated, and the residue was recrystallized from aqueous ethanol. 78% of theory of 5,11 - dimethyl - 5,11 - dihydro - 6H - pyrido[2,3-b][1,4]benzodiazepin-6-one, M.P. 113–114° C., of the formula

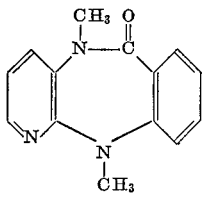

were obtained.

Analysis.—Calc'd for $C_{14}H_{13}N_3O$ (percent) (molecular weight 239.3): C, 70.28; H, 5.48; N. 17.56; Found (percent): C, 70.60; H, 5.59; N, 17.60.

EXAMPLE 4

Preparation of 5-ethyl-11-methyl-5,11-dihydro-6H-pyrido[2,3-b][1,4]benzodiazepin-6-one 56.3 gm. (0.25 mol) of 11-methyl-5,11-dihydro-6H-pyrido[2,3-b][1,4]benzodiazepin-6 - one and 20 gm. of potassiummethylate were admixed with a mixture consisting of 250 cc. of absolute dioxan and 250 cc. of tertiary butanol, and the mixture was refluxed for two hours. Thereafter, the reaction solution was allowed to cool, 45 gm. (0.3 mol) of ethyl iodide were then added dropwise over a period of 45 minutes, and the mixture was again refluxed for two hours. Subsequently, the reaction solution was filtered while still hot, the filtrate was evaporated in vacuo, and the residue was recrystallized from cyclohexane. 72% of theory of 5-ethyl-11-methyl-5,11-dihydro-6H - pyrido[2,3-b][1,4]benzodiazepin - 6-one, M.P. 101–102° C., of the formula

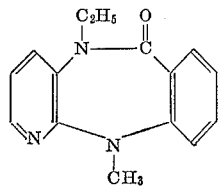

were obtained.

*Analysis.*—Calculated for $C_{15}H_{15}N_3O$ (percent) (molecular weight 253.3): C, 71.13; H, 5.97; N, 16.59. Found (percent): C, 70.90; H, 6.00; N, 16.83.

EXAMPLE 5

Using a procedure analogous to that described in Example 4, 5 - n-propyl-11-methyl-5,11-dihydro-6H-pyrido [2,3-b][1,4]benzodiazepin-6-one, M.P. 98–100° C. (recrystallized from gasoline), was prepared from 11-methyl - 5,11-dihydro - 6H - pyrido[2,3-b][1,4]benzodiazepin-6-one and n-propylbromide. The yield was 65% of theory.

*Analysis.*—Calculated for $C_{16}H_{17}N_3O$ (percent) (molecular weight 267.3): C, 71.89; H, 6.41; N, 15.72. Found (percent): C, 71.70; H, 6.36; N, 15.65.

EXAMPLE 6

Using a procedure analogous to that described in Example 4, 5-allyl-11-methyl - 5,11 - dihydro-6H-pyrido [2,3-b][1,4]benzodiazepin - 6 - one, M.P. 89–90° C. (recrystallized from ethyl acetate), of the formula

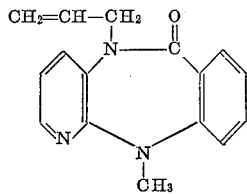

was prepared from 11 - methyl-5,11-dihydro-6H-pyrido [2,3-b][1,4]benzodiazepin-6-one and allyl bromide. The yield was 57% of theory.

*Analysis.*—Calculated for $C_{16}H_{15}N_3O$ (percent) (molecular weight 265.3): C, 72.43; H, 5.70; N, 15.84. Found (percent): C, 72.70; H, 5.81; N, 16.03.

EXAMPLE 7

Using a procedure analogous to that described in Example 4,5 - methyl-11-ethyl-5,11-dihydro - 6H - pyrido [2,3-b][1,4]benzodiazepin-6-one, M.P. 127–128° C. (recrystallized from ethyl acetate), was prepared from 11-ethyl-5-11 - dihydro - 6H - pyrido[2,3-b][1,4]benzodiazepin-6-one and methyl iodide. The yield was 58% of theory.

*Analysis.*—Calculated for $C_{15}H_{15}N_3O$ (percent) (molecular weight 253.3): C, 71.13; H, 5.97; N, 16.59. Found (percent): C, 71.40; H, 6.13; N, 16.47.

EXAMPLE 8

Using a procedure analogous to that described in Example 4, 5,11 - diethyl - 5,11 - dihydro-6H-pyrido[2,3-b] [1,4]benzodiazepin - 6-one, M.P. 95–97° C. (recrystallized from cyclohexane), was prepared from 11-ethyl-5,11 - dihydro - 6H - pyridol[2,3-b][1,4]benzodiazepin-6-one and ethyl iodide. The yield was 76% of theory.

*Analysis.*—Calculated for $C_{16}H_{17}N_3O$ (percent) (molecular weight 267.3): C, 71.89; H, 6.41; N, 15.72. Found (percent): C, 72.00; H, 6.50; N, 15.80.

EXAMPLE 9

Using a procedure analogous to that described in Example 4, 5-allyl-11-ethyl - 5,11 - dihydro-6H - pyrido [2,3-b][1,4]benzodiazepin-6-one, M.P. 135–137° C. (recrystallized from ethyl acetate), was prepared from 11-ethyl-5,11 - dihydro - 6H - pyrido[2,3-b][1,4]benzodiazepin-6-one and allyl bromide. The yield was 56% of theory.

*Analysis.*—Calculated for $C_{17}H_{17}N_3O$ (percent) (molecular weight 279.3): C, 73.10; H, 6.13; N, 15.04. Found (percent): C, 73.20; H, 6.12; N, 14.85.

EXAMPLE 10

Preparation of 11-methyl-5,11-dihydro-6H-pyrido[2,3-b] [1,4]benzodiazepin-6-one by method B 146 gm. (1.13 mols) of 2-chloro-3-amino-pyridine and 200 gm. (1.13 mols) of N-methyl-isatoic acid anhydride were admixed with 320 cc. of 1,2,4-trichloro-benzene, and the mixture was heated while stirring. At about 140° C. the evolution of carbon dioxide began, but the 2-chloro-3 - [(2' - methylamino-benzoyl)-amino]-pyridine formed thereby was not isolated; upon further heating, the evolution of gaseous hydrogen chloride began at about 180° C. The reaction mixture was stirred at 180° C. until the evolution of gas had ceased, which required from 2 to 4 hours. Thereafter, the reaction mixture was allowed to cool, the crystal slurry formed thereby was vacuum filtered, the filter cake was washed with 1,2,4-trichlorobenzene, stirred with 200 cc. of methanol, again vacuum filtered, and the filter cake was washed with methanol and recrystallized from ethanol. About 60% of theory of 11-methyl - 5,11 - dihydro-6H-pyrido[2,3-b] [1,4]benzodiazepin-6-one, M.P. 215–216° C., were obtained.

EXAMPLE 11

Using a procedure analogous to that described in Example 10, 11-ethyl-5,11-dihydro - 6H-pyrido[2,3-b][1,4] benzodiazepin-6-one, M.P. 190–193° C., was prepared from 2-chloro-3-amino-pyridine and N-ethyl-isatoic acid anhydride.

EXAMPLE 12

Preparation of 5,11-dimethyl - 5,11 - dihydro-6H-pyrido [2,3-b][1,4]benzodiazepin-6-one by method B 7.1 gm. (0.05 mol) of 2-chloro-3-methylamino-pyridine and 8.9 gm. (0.05 mol) of N-methyl-isatoic acid anhydride were admixed with 30 cc. of tetraethyleneglycol dimethylether, and the mixture was heated for six hours at 240° C.; the intermediate 2-chloro-3-[N-methyl-N-(2'-methylamino-benzoyl)-amino]-pyridine was not isolated. Thereafter, the tetraethyleneglycol ether and the unreacted 2-chloro-3-methylamine-pyridine were distilled off in vacuo, the oily residue was dissolved in chloroform, and the solution was extracted with aqueous 20% hydrochloric acid. The acid aqueous phase was treated with activated charcoal, made alkaline with ammonia and extracted with chloroform. The chloroform extract solution was dried with sodium sulfate and then fractionally distilled. The fraction passing over at 190–193° C. and 0.3 mm. Hg was recrystallized from cyclohexane in the presence of activated charcoal. About 50% of theory of 5,11-dimethyl - 5,11 - dihydro - 6H - pyrido[2,3-b][1,4] benzodiazepin-6-one, M.P. 113–114° C., were obtained.

The compounds according to the present invention, that is those embraced by Formula I above, have useful pharmacodynamic properties. More particularly, they exhibit antiphlogistic, analgesic, antipyretic, sedative and anticonvulsive activities in warm-blooded animals, such as mice and rats. With respect to antiphlogistic and analgesic activity, the compounds according to the present invention are significantly more effective than the related compounds described in German Pats. 1,179,943, and 1,204,680.

Two representative species of the novel class of compounds according to the present invention were tested for analgesic, antipyretic and antiphlogistic activities and acute toxicity by standard pharmacological test methods. The following compounds were tested:

(A) 11-methyl-5,11-dihydro-6H-pyrido[2,3-b][1,4]benzodiazepin-6-one, and
(B) 5-ethyl-11-methyl-5,11-dihydro-6H-pyrido[2,3-b][1,4]benzodiazepin-6-one.

(1) Analgesic activity.—The tail-pinch method according to Haffner, Deutsche Medizinische Wochenschrift 1929, page 731, was used. The Dieffenbach clamp used in the test to pinch the base of the tail of the test animals exerted a pressure of 350–400 gm. when opened to a width equal to the average diameter of the base of a mouse tail. Adult male laboratory mice of the NMRI-strain having an average weight of 20 gm. were used. The compound under investigation was administered to the test animals perorally in the form of a ground mixture with methyl cellulose by means of an esophageal sound. At intervals of 30 minutes after administration of the compound under investigation the number of animals was determined which no longer reacted to the pain stimulus produced by application of the clamp to the base of the tail, and the maximum percentage of animals so affected was calculated. The test was repeated at varying dosage levels for each compound, and the results were plotted on a graph. From this graph the median effective analgesic dose ($ED_{50}$), i.e. the dose at which 50% of the test animals no longer react to the pain stimulus, was determined for each compound by graphic extrapolation. The results are shown in the following table:

TABLE I

| | Number of different doses | Number of animals per dose | Analgesic $ED_{50}$, mgm./kg. |
|---|---|---|---|
| Compound: | | | |
| A | 3 | 20 | 150 |
| B | 3 | 20 | 130 |

(2) Antipyretic activity.—The antipyretic activity of the compounds was tested on adult laboratory rats of an average body weight of 140 gm. and having normal body temperatures. The body temperature of each animal was continuously recorded by means of a thermocouple inserted into the rectum. The climactic conditions were held constant (room temperature 21.5° C.; relative humidity 60–70%) during the entire test. Prior to administration of the compound under investigation, the constancy of the body temperature of each untreated animal was ascertained for at least one hour. The compound under investigation was administered to the test animals perorally at varying dosage levels in the form of a ground mixture with methyl cellulose by means of an esophageal sound. From the temperature measurements thus obtained, the median dose was graphically determined which would lower the body temperature by 2.0° C. ($ED_{-2.0° C.}$). The following results were obtained:

TABLE II

| Compound | Dose, mgm./kg. | Number of animals | Average depression of body temperature, ° C. | $ED_{-2.0°C.}$, mgm./kg. |
|---|---|---|---|---|
| A | 12.5 | 10 | 0.6 | 25.0 |
| | 25.0 | 10 | 1.8 | |
| | 50.0 | 10 | 3.6 | |
| B | 12.5 | 10 | 0.4 | 26.0 |
| | 25.0 | 10 | 2.2 | |
| | 50.0 | 10 | 3.2 | |

(3) Antiphlogistic activity.—The antiphlogistic activity was tested by means of the granuloma-pouch technique according to Selye, Recent Progress in Hormone Research 8, 117 (1953). For this test adult male laboratory rats having a body weight of 150–180 gm. were used. On the first day 25 cc. of air were injected under the dorsal skin, and then 0.5 cc. of a 5% solution of croton oil in sesame oil was injected into the air pocket formed thereby. The compound under investigation was administered to the animals once a day perorally in the form of a ground mixture with methyl cellulose by means of an esophageal sound. On the ninth day after the administration of the croton oil solution the animals were sacrificed, and the amount of exudate in the pouch was measured and converted to a basis of 100 gm. body weight. The percentage reduction in the amount of exudate over that formed in a group of control animals was then calculated and plotted. The control animals were treated in identical fashion, except that they were not given any of the compound under investigation nor any other antiphlogistic treatment. From the values thus obtained the $ED_{30}$, i.e. the median dose which produces a 30% reduction in the amount of exudate, was calculated by graphic etrapolation. The results obtained are shown in the following table:

TABLE III

| | Dose, mgm./kg. | Number of animals | Amount of exudate, cc./100 gm. | Reduction, percent | $ED_{30}$, mgm./kg. |
|---|---|---|---|---|---|
| Compound: | | | | | |
| Controls | | 25 | 7.99 | | |
| A | 50 | 20 | 6.54 | 18.2 | |
| | 100 | 18 | 5.88 | 26.4 | 135 |
| | 200 | 18 | 5.18 | 35.2 | |
| Controls | | 25 | 7.99 | | |
| B | 50 | 19 | 7.06 | 11.6 | |
| | 100 | 16 | 5.50 | 31.2 | 130 |
| | 200 | 19 | 5.24 | 34.4 | |

(4) Acute toxicity.—The acute toxicity was tested on a group of adult male laboratory mice having an average body weight of 20 gm. The compound under investigation was administered perorally at varying dosage levels in the form of a ground mixture with methyl cellulose by means of an esophageal sound, and the number of animals which perished within 24 hours was recorded for each dose. Ten animals per dose were used. The median lethal dose ($LD_{50}$) was calculated according to Litchfield and Wilcoxon. The following values were obtained:

Table IV

| Compound: | $LD_{50}$ mgm./kg. |
|---|---|
| A | >3000 |
| B | 1550 |

The above tests show that the compounds are very effective analgesics, antipyretics and antiphlogistics, with low acute toxicity.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, solutions, suspensions, syrups, wafers, capsules, suppositories and the like. One effective single dosage unit of the compounds according to the present invention is 1.25 mgm./kg. body weight, and the daily dose is from 3.3 to 4.2 mgm./kg. body weight.

The following examples illustrate a few dosage unit compositions containing a compound according to the present invention, and represent the best mode contemplated of putting the instant invention to practical use. The parts are parts by weight unless otherwise specified.

EXAMPLE 13

Tablets

The tablet composition was compounded from the following ingredients:

| | Parts |
|---|---|
| 11-methyl - 5,11 - dihydro-6H-pyrido[2,3-b][1,4]-benzodiazepin-6-one | 75.0 |
| Lactose | 90.0 |
| Potato starch | 50.0 |
| Polyvinylpyrrolidone | 4.0 |
| Magnesium stearate | 1.0 |
| Total | 220.0 |

Compounding procedure.—The pyridobenzodiazepinone compound was intimately admixed with the lactose and the potato starch, the mixture was moistened with an aqueous 10% solution of the polyvinylpyrrolidone, the moist mass was forced through a 1.5 mm.-mesh screen, the moist granulate obtained thereby was dried at 45° C. and again passed through the screen, the dry granulate was admixed with the magnesium stearate, and the mixture was pressed into 220 mgm.-tablets with the aid of a conventional tablet-making machine. Each tablet contained 75 mgm. of the pyridobenzodiazepinone compound and, when administered perorally to a warm-blooded animal of approximately 60 kg. body weight in need of such treatment, produced very good analgesic, antipyretic and antiphlogistic effects.

EXAMPLE 14

Gelatin capsules

The capsule filler composition was compounded from the following ingredients:

| | Parts |
|---|---|
| 5-ethyl-11 - methyl-5,11-dihydro-6H-pyrido[2,3-b]-[1,4]benzodiazepin-6-one | 75.0 |
| Corn starch | 49.0 |
| Colloidal silicic acid | 1.0 |
| Total | 125.0 |

Compounding procedure.—The individual ingredients were intimately admixed with each other, the mixture was forced through a 0.3 mm.-mesh screen, and 125 mgm.-portions of the screened composition were filled into gelatin capsules of suitable size. Each capsule contained 75 mgm. of the pyridobenzodiazepinone compound and, when administered perorally to warm-blooded animal of about kg. body weight in need of such treatment, produced very good analgesic, antipyretic and antiphlogistic effects.

EXAMPLE 15

Syrup

The syrup was compounded from the following ingredients:

| | Parts |
|---|---|
| 11 - methyl - 5,11-dihydro-6H-pyrido [2,3-b][1,4] benzodiazepin - 6 - one | 0.7 |
| Colloidal silicic acid | 3.0 |
| Carboxymethyl cellulose, high viscosity | 0.5 |
| p-Hydroxy-benzoic acid propyl ester | 0.03 |
| p-Hydroxy-benzoic acid methyl ester | 0.07 |
| Saccharin sodium | 0.1 |
| Essence of cocoa | 1.5 |
| Glycerin | 5.0 |
| Sugar | 32.0 |
| Distilled water | 72.1 |
| Total | 115.0 |

Compounding procedure.—The distilled water was heated to 80° C., the p-hydroxy benzoic acid esters were dissolved therein, the silicic acid was suspended in the solution, the saccharin sodium and a mixture of the carboxymethyl cellulose and sugar were dissolved in the suspension, the liquid composition was cooled to room temperature, the finely pulversized pyridobenzodiazepinone compound was stirred into it, and finally the glycerin and essence of cocoa were added. 5 cc. of the finished syrup contained 35 mgm. of the pyridobenzodiazepinone compound and, when administered perorally to a warm-blooded animal of about 60 kg. body weight in need of such treatment, produced very good analgesic, antipyretic and antiphlogistic effects.

EXAMPLE 16

Suppositories

The suppository composition was compounded from the following ingredients:

| | Parts |
|---|---|
| 5-ethyl-11-methyl - 5,11 - dihydro-6H-pyrido[2,3-b] [1,4]benzodiazepin-6-one | 20.0 |
| Cocoa butter | 980.0 |
| Total | 1000.0 |

Compounding procedure.—The cocoa butter was melted and then cooled to about 40° C., the finally pulverized pyridobenzodiazepinone compound was stirred into it with the aid of an immersion homogenizer, the mixture was cooled to 35° C. and then poured into cooled suppository molds each holding 1000 mgm. of the mixture. Each suppository contained 20 mgm. of the pyridobenzodiazepinone compound and, when administered by the rectal route to a warm-blooded animal of about 10 kg. body weight in need of such treatment, produced very good analgesic, antipyretic and antiphlogistic effects.

EXAMPLE 17

Coated pills with barbiturate component

The pill core composition was compounded from the following ingredients:

| | Parts |
|---|---|
| 11-methyl-5,11-dihydro - 6H - pyrido[2,3-b][1,4] benzodiazepin - 6 - one | 75.0 |
| Phenylethylbarbituric acid | 30.0 |
| Lactose | 69.0 |
| Carn starch | 40.0 |
| Gelatin | 4.0 |
| Magnesium stearate | 2.0 |
| Total | 220.0 |

Compounding procedure.—The pyridobenzodiazepinone compound and the barbituric acid compound were intimately admixed with each other and with the lactose and the corn starch, the mixture was moistened with an aqueous 10% solution of the gelatin, the moist mass was forced through a 1.5 mm.-mesh screen, and the moist granulate obtained thereby was dried at 45° C. and then again passed through the screen. The dry granulate was admixed with the magnesium stearate, and the mixture was pressed into 220 mgm.-pill cores which were then coated with a thin shell consisting essentially of a mixture of sugar and talcum and polished with beeswax. Each pill contained 75 mgm. of the pyridobenzodiazepinone compound and 30 mgm. of the barbituric acid compound and, when administered perorally to a warm-blooded animal of about 60 kg. body weight in need of such treatment, produced very good analgesic, antipyretic and antiphlogistic effects.

EXAMPLE 18

Suppositories with codeine phosphate

The suppository composition was compounded from the following ingredients:

| | Parts |
|---|---|
| 5-ethyl - 11-methyl-5,11-dihydro-6H-pyrido[2,3-b] [1,4]benzodiazepin - 6 - one | 35.0 |
| Codeine phosphate | 5.0 |
| Cocoa butter | 960.0 |
| Total | 1000.0 |

The compounding procedure was the same as in Example 17. Each suppository contained 35 mgm. of the pyridobenzodiazepinone compound and 5 mgm. of codeine phosphate and, when administered by the rectal route to a warm-blooded animal of about 15 kg. body weight in need of such treatment, produced very good analgesic, antipyretic and antiphlogistic effects.

Although the above dosage unit composition examples illustrate only two specific compounds of the generic group embraced by Formula I as active ingredients, it should be understood that any other compound embraced by Formula I may be substituted for the particular pyridobenzodiazepinone compound in Examples 14 through 18. Moreover, the amount of the active ingredient according to the present invention in these examples may be varied to achieve the dosage unit range set forth above, and the amounts and nature of the inert ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

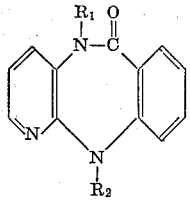

wherein
$R_1$ is hydrogen, alkyl of 1 to 3 carbon atoms or allyl, and $R_2$ is methyl or ethyl.

2. A compound according to claim 1, which is 11-methyl - 5,11 - dihydro - 6H - pyrido[2,3-b][1,4]benzodiazepin-6-one.

3. A compound according to claim 1, which is 5,11-dimethyl - 5,11 - dihydro-6H-pyrido[2,3 - b][1,4]benzodiazepin-6-one.

4. A compound according to claim 1, which is 5-ethyl-11-methyl-5,11-dihydro - 6H - pyrido[2,3-b][1,4]benzodiazepin-6-one.

References Cited

UNITED STATES PATENTS 3,406,168  10/1968  Schmidt _____ 260—239.3

HENRY R. JILES, Primary Examiner

R. T. BOND, Assistant Examiner

U.S. Cl. X.R.

424—263, 244